United States Patent [19]

Stangebye-Hansen

[11] Patent Number: 6,109,454
[45] Date of Patent: Aug. 29, 2000

[54] STORING SYSTEM FOR COMPACT DISCS

[76] Inventor: Henrik Stangebye-Hansen, Majororstuveien 25 B, N-0367 Oslo, Norway

[21] Appl. No.: 09/051,736

[22] PCT Filed: Oct. 23, 1996

[86] PCT No.: PCT/NO96/00248

§ 371 Date: Apr. 5, 1999

§ 102(e) Date: Apr. 5, 1999

[87] PCT Pub. No.: WO97/15511

PCT Pub. Date: May 1, 1997

[30]     Foreign Application Priority Data

Oct. 23, 1995  [NO]  Norway .................................... 954241

[51] Int. Cl.[7] ..................................................... A47F 5/00
[52] U.S. Cl. .................. 211/40; 211/DIG. 1; 211/41.12; 206/308.1
[58] Field of Search .................. 211/40, 41.12, 211/DIG. 1, 70.7; 206/308.1; 248/309.4, 37.6

[56]          References Cited

U.S. PATENT DOCUMENTS

| | | |
|---|---|---|
| 3,842,980 | 10/1974 | Kushner ............................ 211/DIG. 1 |
| 4,586,616 | 5/1986 | Cooper et al. ..................... 211/DIG. 1 |
| 4,648,514 | 3/1987 | Niles . |
| 4,883,175 | 11/1989 | Thiele et al. . |
| 4,951,826 | 8/1990 | Tompkins ................... 211/40 |
| 5,115,919 | 5/1992 | Dorman ........................ 211/DIG. 1 |
| 5,117,984 | 6/1992 | Kennedy ..................... 211/40 |
| 5,292,010 | 3/1994 | Pickles et al. . |
| 5,344,028 | 9/1994 | Angele ....................... 211/40 |
| 5,495,953 | 3/1996 | Bearth ....................... 211/40 |
| 5,921,405 | 7/1999 | Dumas ....................... 211/40 |
| 5,931,315 | 8/1999 | Lorentz et al. ............ 211/40 |
| 5,947,301 | 9/1999 | Kunz ........................ 211/41.12 X |

*Primary Examiner*—Robert W. Gibson, Jr.
*Attorney, Agent, or Firm*—Marshall, O'Toole, Gerstein, Murray & Borun

[57]          ABSTRACT

A storing system for compact discs includes at least one metal clip (1) made of sheet metal adapted to be secured to the back of each compact disc box (2). Each clip (1) has a flange gripping the underside of the box, the clip (1) extending around the back face and the front face of the box to a second flange extending into the box (2) between the box and the box cover (3), the clip (1) thereby being biased and clamped to the box by the flanges. The system also includes a magnet bar (4) to which the compact disc box (2) may be easily secured by means of the metal clip (1).

15 Claims, 2 Drawing Sheets

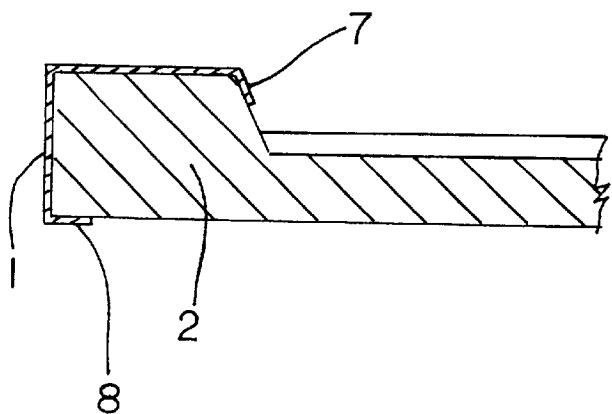
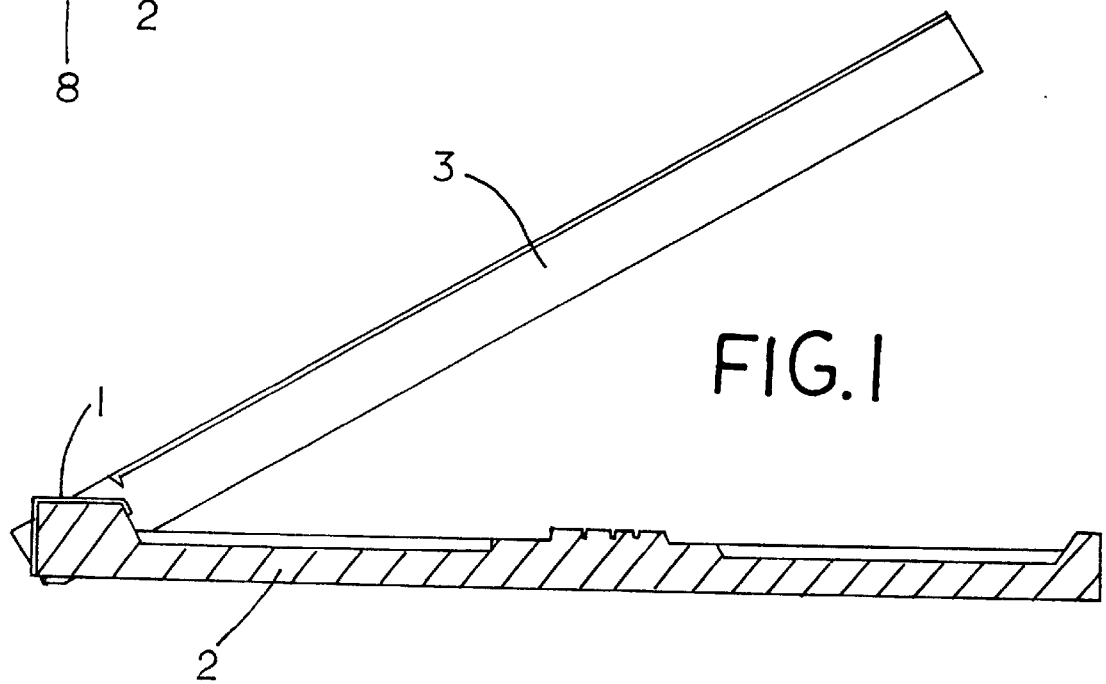
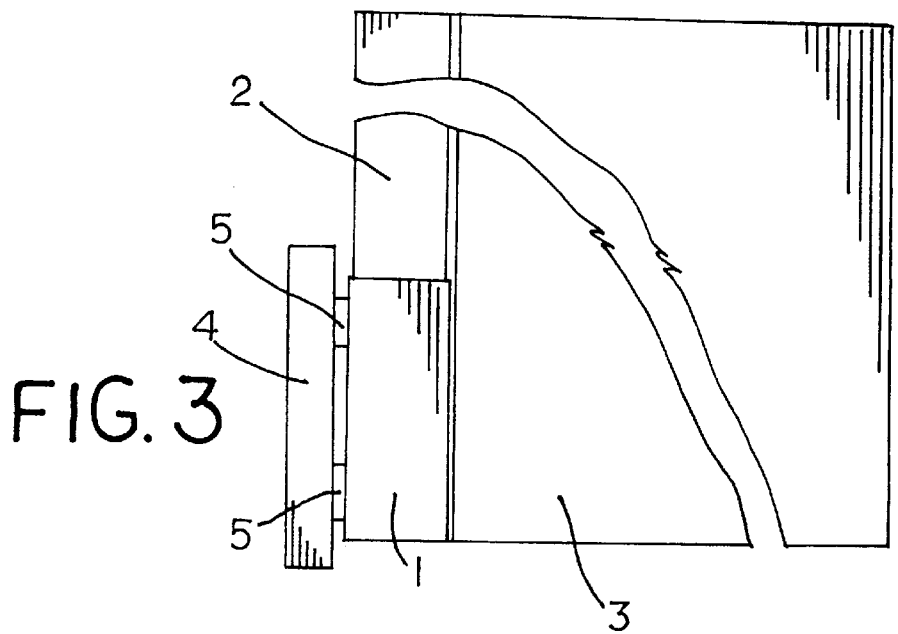

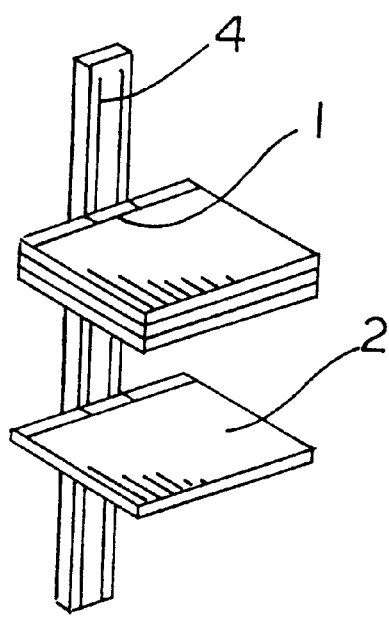
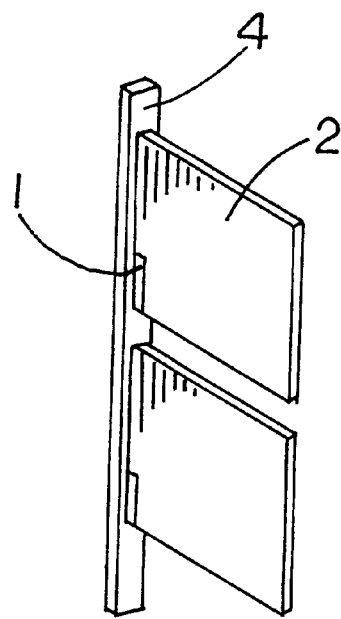
FIG. 4  FIG. 5
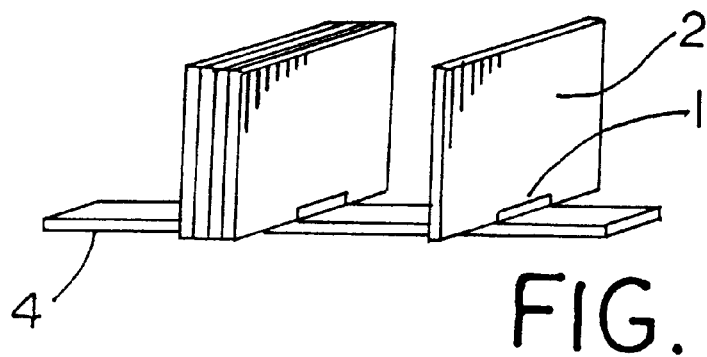
FIG. 6
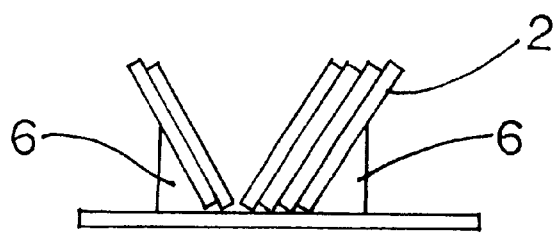
FIG. 7

STORING SYSTEM FOR COMPACT DISCS

FIELD OF THE INVENTION

The present invention is related to a storing system for compact discs (CD).

BACKGROUND OF THE INVENTION

A plurality of suggested systems is available on the market for storing of compact discs. Such systems being adapted for storing discs vertically in such a way that the user is looking down to the edge face of the disc comprising the title field or the user is looking horizontally with the discs standing vertically in a book shelf like position. Furthermore the discs may be stored horizontally in a stack like manner.

Most commonly the storing systems are provided with partitions or slot, each accommodating one disc. Such partitions, however, utilize part of the space, leaving less space for storing discs. When storing discs by horizontal displacement the user will be able to read the text on the edge face of the discs, the discs thereby being arranged horizontally or vertically. In all such embodiments the partitions occupy part of the total system volume, the systems additionally very often being built into box like houses.

SUMMARY OF THE INVENTION

With the storing system according to the present invention, however, a system is provided for optional storing according to the needs of the individual user. Partitions, slots or the like between the discs are avoided, thereby utilizing the total volume almost entirely for storing discs.

The above advantages are achieved with the storing system according to the present invention as defined by the features stated in the claims.

BRIEF DESCRIPTION OF THE DRAWINGS

FIG. 1 is a cross-sectional view of a compact disc holder having secured thereto a metal clip assembled in accordance with the teachings of the present invention;

FIG. 2 is an enlarged fragmentary cross-sectional view of the clip shown in FIG. 1;

FIG. 3 is a side elevational view of a compact disc holder secured to a magnet bar arranged horizontally on a wall;

FIG. 4 is a perspective view of a pair of compact disc holders secured horizontally to a vertical magnet bar on a wall;

FIG. 5 is a perspective view of a pair of compact disc holders secured vertically to a vertical magnet bar on a wall;

FIG. 6 is a perspective view of a pair of compact disc holders secured vertically to a horizontal magnet bar on a horizontal surface; and FIG. 7 is an elevational view of a plurality of compact disc holders secured to a magnet bar arranged on a horizontal surface and being adapted to permit tilting of the holders from side to side, thereby enabling a user to read the front covers of the compact disc holders individually.

DETAILED DESCRIPTION OF THE INVENTION

A metal clip 1 is shaped to conform with the hinge portion of a standard compact disc, and includes a pair of flanges 7, 8. Flange 7 is adapted to grip the inclined surface of the disc box 2 towards the disc position, while flange 8 is adapted to grip the underside of the disc box 2. Flange 8 is generally flat and lies flat against the back face of the box 2. The thickness of the clip sheet being such that opening and closing of the box cover 3 is possible utilizing the slot between the box 2 and the cover 3.

The clip 1 being biased by the two flanges upon installation. The clip may be snapped in place at any place along the back of the box 2, depending on the desired use.

The flat faces of the clip 1, namely the back face and the flat front face, may be utilized for price tag, logo etc or other information. Utilizing the clip 1 for the prize tag avoids the usual tag on the box 2 or the cover 3.

With a clip 1 secured to a compact disc box, the box easily may be secured to a magnet bar 4 comprising at least one magnet list 5.

As disclosed in FIG. 4 a magnet bar 4 may be secured vertically to a wall thereby enabling securement of disc boxes horizontally above and below each other.

FIG. 5 discloses how disc boxes 2 may display the front cover of the box when each box is secured vertically to a vertical magnet bar 4.

As can be seen from FIG. 6, the magnet bar 4 may be arranged on a horizontal surface. Disc boxes 2 may be secured vertically on and transversely to the bar 4.

The disc boxes 2 may be secured anywhere on the magnet bar 4, spaced apart or side by side. A desired disc box 2 easily may be taken out of the line by tilting the box 2 by pressing the outer edge of the box 2 against the magnet bar 4, thereby gripping the free part of the box.

FIG. 7 discloses schematically how boxes 2 may be secured to a magnet bar 4, utilizing a wedge like stopper 6 on each side. For this purpose each disc box may be provided with one clip 1 at each end, using two connected magnet bars 4.

What is claimed is:

1. Storing system for use with a compact disc box, the storing system comprising at least one metal clip (1) made of sheet metal and being adapted to be secured to the back of the compact disc box (2), the clip (1) having a first flange (7) gripping the underside of the compact disc box, the clip (1) extending along a back face and a front face of the compact disc box comprising a hinge portion of the compact disc box, the clip including a second flange (8) extending into the compact disc box (2) between the compact disc box (2) and a box cover (3), the clip (1) thereby being biased and clamped to the compact disc box by the flanges, the system further comprising a magnet bar (4) to which the compact disc box (2) easily may be secured by means of the metal clip (1).

2. System according to claim 1, wherein the magnet bar (4) includes a series of magnets (5) adapted to hold the compact disc box (2).

3. System according to claim 1, wherein the magnet bar (4) is adapted to be secured vertically or horizontally to a generally vertical surface.

4. System according to claim 1, CHARACTERIZED BY the magnet bar (4) being adapted for support by a horizontal surface.

5. System according to claim 4, including a pair of wedge like stoppers (6) adapted for attachment to the magnet bar (4) in spaced apart relation, the stoppers being adapted to thereby enable tilting of a compact disc box placed therebetween, thereby disclosing a front cover of the compact disc box to a user.

6. System according to claim 5, including a second magnet bar (4) and wherein the compact disc box (2) is provided with two clips (1), each clip (1) securing the compact disc box (2) to one of the magnet bars (4), the two magnet bars (4) thereby cooperating with each other to support the compact disc box (2).

7. For use with a compact disc box having a hinge portion, a front portion, and a back portion, a device for supporting the compact disc box on a magnetic support structure, the device comprising a metal clip having first and second flanges, the first flange being adapted to engage the front portion of the compact disc box and the second flange being adapted to engage the back portion of the compact disc box to thereby secure the clip to the compact disc box generally adjacent to the hinge portion, a portion of the clip being adapted for releasable engagement with the support structure.

8. The device of claim 7, the compact disc box including a cover joined to the hinge portion by a pivot, and wherein the first flange is sized to permit movement of the cover about the pivot without interference by the first flange.

9. The device of claim 7, the compact disc box including a cover being shiftable to an open position in which a gap is defined between the cover and the hinge portion, and wherein the first flange is sized to extend into the gap.

10. The device of claim 7, wherein the first flange is inclined.

11. For securing a compact disc box having a hinge portion to a support structure, a clip device comprising first and second flanges, the first and second flanges being arranged to receive the hinge portion therebetween to thereby secure the clip to the compact disc box, at least a portion of the clip being adapted for releasable engagement with the support structure, and a supporting bar adapted for securement to the support structure, at least a portion of the clip being metal and a portion of the supporting bar being magnetic.

12. The clip device of claim 11, wherein the first flange is inclined.

13. The clip device of claim 11, the compact disc box having a front portion and a rear portion, and wherein the first flange is adapted to engage the front portion and the second flange is adapted to engage the rear portion.

14. For use with a compact disc box having a hinge portion, a front portion, and a back portion, a device for supporting the compact disc box on a support structure, the device comprising a clip having first and second flanges, the first flange being adapted to engage the front portion of the compact disc box and the second flange being adapted to engage the back portion of the compact disc box to thereby secure the clip to the compact disc box generally adjacent to the hinge portion, a portion of the clip being adapted for releasable engagement with the support structure, and at least one stop member, the stop member being adapted for securement to the support structure, the stop member further being adapted to support at least a portion of the compact disc box.

15. For use with a compact disc box having a hinge portion, a front portion, and a back portion, a device for supporting the compact disc box on a support structure, the device comprising a clip having first and second flanges, the first flange being adapted to engage the front portion of the compact disc box and the second flange being adapted to engage the back portion of the compact disc box to thereby secure the clip to the compact disc box generally adjacent to the hinge portion, a portion of the clip being adapted for releasable magnetic engagement with the support structure.

* * * * *